Oct. 15, 1940.  W. RECKHOW  2,218,359
AUTOMATIC EQUALIZER
Filed Feb. 23, 1939  2 Sheets-Sheet 1

Inventor:
William Reckhow
By
McCanna, Wintercorn & Morsbach
Attys.

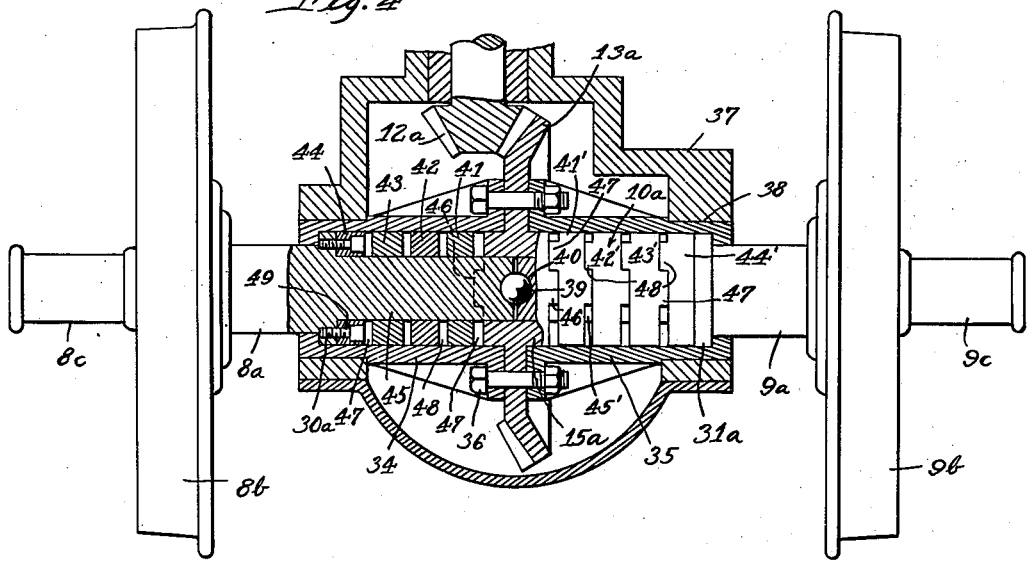
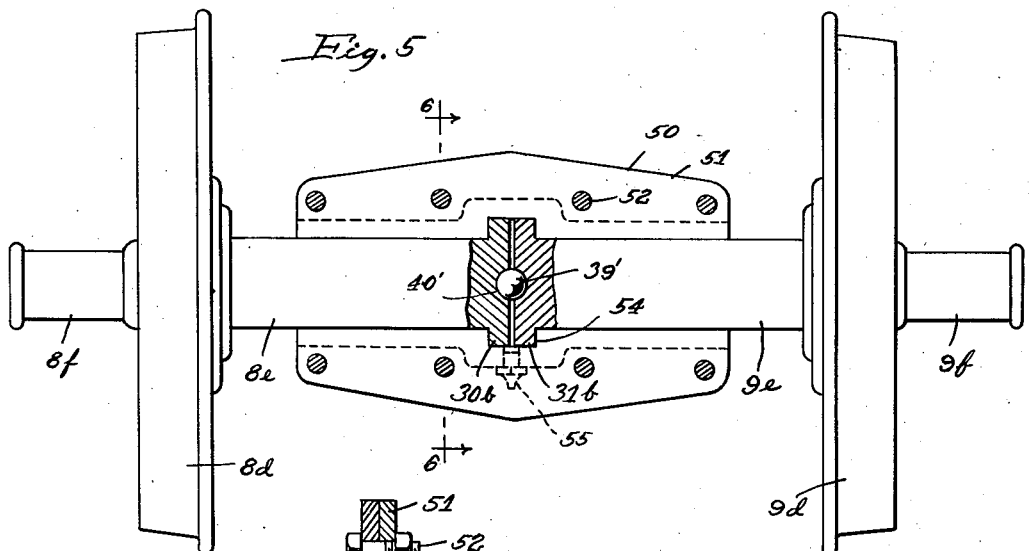
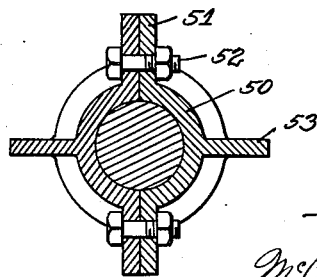

Patented Oct. 15, 1940

2,218,359

UNITED STATES PATENT OFFICE 2,218,359

AUTOMATIC EQUALIZER

William Reckhow, Rockton, Ill.

Application February 23, 1939, Serial No. 257,895

6 Claims. (Cl. 74—389.5)

This invention relates to a new and improved automatic equalizer for use on various self-propelled vehicles.

Rail cars and locomotives have all along had companion wheels turning together as a unit, despite the great deal of wear and tear which that has occasioned on the rails and wheels alike in traveling around curves, where the outer wheel should turn faster than the inner wheel. Apparently, despite the universal application of differentials in the automotive field, no solution was found for the somewhat similar problem presented on railroads. At any rate, it is a significant fact that although railway cars date back long before automobiles, this particular problem of equalizing the wheels has, so far as I am aware, never been solved. It is therefore one of the principal objects of my invention to provide an automatic equalizer for the drive wheels of locomotives, as well as equalizing means for all other wheels of rolling stock on railroads, whereby to minimize drag and eliminate unnecessary wear upon the wheels and rails.

It is another important object of my invention to provide an improved automatic equalizer of simple and economical construction suitable for power transmission generally, wherever drive is transmitted to two wheels and occasionally one must overrun the other.

The invention is illustrated in the accompanying drawings, in which—

Fig. 4 is a view partly in section and partly in elevation illustrating the application of the equalizer to the locomotive drive wheels;

Fig. 5 is a similar view showing an equalizer for the dead axle sections of other rail car wheels, and Fig. 6 is a cross-section on the line 6—6 of Fig. 5.

Similar reference numerals are applied to corresponding parts throughout the views.

Figure 1:
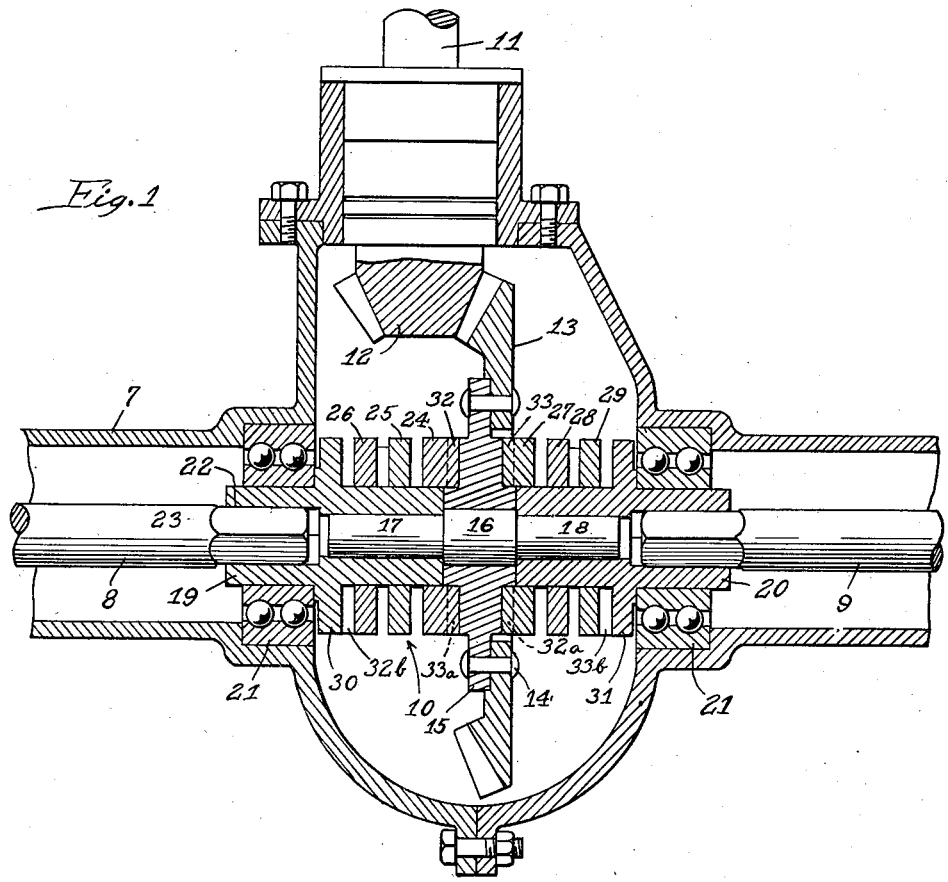
Fig. 1 is a section through an equalizer made in accordance with my invention.
Figure 2:
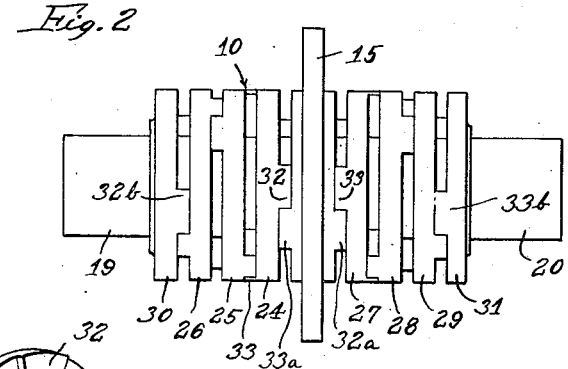
Fig. 2 is an elevational view of the equalizing mechanism by itself.
Figure 3:
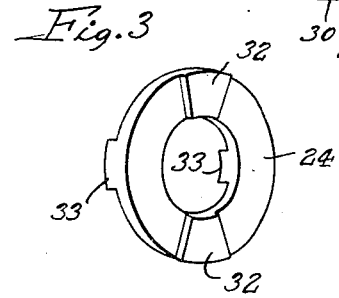
Fig. 3 is a perspective view of one of the equalizer rings, showing the drive lugs thereon.

Referring first to Fig. 1 in which the numeral 7 designates a rear axle housing for an automobile or tractor, and 8 and 9 are opposed axle shafts extending to the two drive wheels, the equalizer of my invention is indicated generally by the reference numeral 10 and serves to transmit drive from the propeller shaft 11 equally to both wheels through axle shafts 8 and 9 while permitting either shaft on occasion to turn faster than the other shaft to which drive is still transmitted. 12 is a bevel drive pinion turning with the propeller shaft 11 and meshing with the bevel ring gear 13 riveted or otherwise suitably secured, as at 14, to the middle drive member 15 of the equalizer 10. I may, of course, utilize a worm and gear drive at this point in place of the spur-gearing, as desired. The member 15 is supported on the enlarged middle portion of a stub shaft 16 which has reduced portions 17 and 18 entered in sleeves 19 and 20 supported in bearings 21 in the rear axle housing. The sleeves 19 and 20 have square holes 22 in the outer ends thereof to receive the squared ends 23 of the axle shafts 8 and 9, although, of course, the axle shafts may be splined for a corresponding detachable driving connection with the sleeves 19 and 20. Drive is transmitted from the member 15 to the sleeve 19 through drive rings 24, 25 and 26, and to the sleeve 20 through drive rings 27, 28 and 29, the sleeve 19 having an annular rim 30 for engagement with the outermost drive ring 26, and the sleeve 20 having an annular rim 31 for engagement with the outermost drive ring 29. Each of the rings 24—29 has a pair of diametrically opposed drive lugs 32 provided on one side thereof and another pair of diametrically opposed drive lugs 33 provided on the other side thereof. In like manner, the middle drive member 15 has diametrically opposed drive lugs 32a on one side thereof and diametrically opposed drive lugs 33a on the other side thereof. The rim 30 has diametrically opposed drive lugs 32b provided on the inner side thereof, and the rim 31 has diametrically opposed drive lugs 33b on the inner face thereof. With this arrangement I obtain a lost motion driving connection between the middle drive member 15 and both sleeves 19 and 20, the lugs 32a and 33a transmitting drive to the rings 27 and 24, respectively, by engagement with their lugs 33 and 32, respectively, and those rings in turn transmitting drive through the adjacent intermediate rings to the rims 31 and 30, respectively, on the sleeves 20 and 19, respectively. The axle shafts 8 and 9, of course, are driven through their connections with the sleeves 19 and 20, respectively. In turning a corner or making a curve, the axle shaft connected to the outermost wheel simply overruns as permitted by the lost motion in the equalizer mechanism 10 while drive continues to be transmitted to the other axle shaft. After a straightaway course is resumed, the drive continues to the one axle shaft until the lost motion is taken up again, whereupon drive is resumed to the two axle shafts. It is obvious that in reverse drive the same equalizing action is obtained because the lost motion is effective in either direction.

Now, of course, while I have shown two lugs 32, 180° apart, and two lugs 33, 180° apart, it is obvious that I may provide only one lug 32 and one lug 33 and thus virtually double the amount of lost motion permitted. Furthermore, while I have shown three intermediate drive rings 24—26 and 27—29 between the middle drive member 15 and each of the sleeves 19 and 20 for transmitting drive to the axle shafts, I may decrease or increase the number of drive rings used, depending upon the amount of lost motion desired.

In Fig. 4, 8a and 9a designate two axle sections associated with locomotive drive wheels 8b and 9b to which they are fixed. These axle sections also provide projecting journals 8c and 9c, respectively, adapted to be received in the usual journal boxes for support of the locomotive. The bevel drive pinion 12a is driven through suitable transmission mechanism from the locomotive's Diesel engine or other prime mover and meshes with the bevel ring gear 13a on the opposite sides of which are secured cup-shaped housings 34 and 35 by means of through bolts 36. These housings enclose the equalizer mechanism 10a for transmitting drive from the drive hub 15a of the ring gear 13a to the two axle sections 8a and 9a. A housing 37 encloses the gears 12a and 13a and provides bearings in the opposite ends thereof for the outer ends of the housings 34 and 35, as indicated at 38. The axle sections have annular rims 30a and 31a provided thereon for abutment with the end walls of the housings 34 and 35 to retain the axle sections against endwise displacement from the housings. A bearing ball 39 fits in centrally located half-round sockets 40 provided in the ends of the axle sections, whereby to assume end thrust in the opposite direction. Four rings numbered 41 to 44 surround the reduced inner end portion 45 of the axle section 8a and serve to transmit drive from the hub 15a to the axle section 8a by the interengagement of lugs 46 on the hub 15a with lugs 47 on the first ring 41 and the engagement of lugs 48 on the opposite side of the ring 41 with other lugs 47 on the inner side of the next ring 42, and so on, to the ring 44 which has lugs 47 only on its inner side for driving engagement with the lugs 48 on the outer side of the ring 43. Bolts 49 serve to secure the ring 44 to the rim 30a, whereby torque applied to the ring 44 is transmitted to the axle section 8a. The rings 41'—44' surrounding the reduced inner end portion 45' of the axle section 9a serve to transmit drive from the lugs 46 on their side of the hub 15a through the intermediate rings 41'—43' to the ring 44' secured to the rim 31a on the axle section 9a. In that way, there is a lost motion driving connection between the ring gear 13a and each of the axle sections 8a and 9a, and drive is transmitted evenly to both axle sections while the locomotive is on a straight run, but on a curve in the tracks, the outer wheel can turn faster than the inner wheel, as permitted by the lost motion, while drive is still applied to the inner wheel. After the curve is passed, drive is continued to the one wheel until the lost motion is taken up in the equalizer mechanism 10a, whereupon drive is resumed to both wheels. It is obvious that in backing up or in reverse drive, the same equalizing action is obtained because the lost motion is effective in either direction. Here again, while I will ordinarily provide two lugs 47 in diametrically opposed relation on one side of each of the rings 41—43 and 41'—43' and two lugs 48 in diametrically opposed relation on the opposite side of each of these rings, it will be obvious that the amount of lost motion may be virtually doubled by providing only one drive lug on each side of each ring. Furthermore, while I have shown four rings 41—44 and 41'—44' associated with each of the axle sections 8a and 9a, respectively, it will be seen that I may increase or decrease the number of rings to accordingly increase or decrease the amount of lost motion. The construction shown in Figs. 5 and 6 is usable on all other rolling stock on railroads where the wheels 8d and 9d have dead axle sections 8e and 9e, respectively, and have journal ends 8f and 9f for bearing engagement in journal boxes in the usual way. A two-piece housing 50 receives the ends of the axle sections, and its two sections are flanged, as at 51, to permit bolting the sections together, as at 52, and also have longitudinal reenforcing ribs 53 for added strength and rigidity. The two axle sections have annular rims 39b and 31b on their inner ends received in an annular recess 54 provided therefor in the middle of the housing 50, whereby to prevent endwise displacement of the axle sections from the housing. The bearing ball 39' fits in centrally located substantially half-round sockets 40' provided in the inner ends of the axle sections to assume end thrust in the opposite direction. At 55 is indicated a nipple for supplying lubricant under pressure to the enlarged middle portion 54 of the housing 50 to insure adequate lubrication of the axle sections for what small amount of relative rotation there will be. The housing 50 will turn with the axle sections 8e and 9e as a unit, but may, if desired, be guided relative to the bottom of the rail car for vertical movement with the axle sections, so that both axle sections turn with respect thereto at all times.

In both railway applications (Figs. 4 and 5), it will be seen that the axle halves find adequate bearing support in the equalizer housing which extends outwardly in both directions from the middle of the axle to points near the wheels, so that there is adequate support.

It is believed the foregoing description conveys a good understanding of the objects and advantages of my invention. The appended claims have been drawn with a view to covering all legitimate modifications and adaptations.

I claim:

1. An equalizer mechanism comprising in combination, opposed driven shafts, a drive member, opposed housings turning with the drive member and surrounding adjacent end portions of the driven shafts, said shafts having annular rims thereon disposed inside said housings and arranged to engage surfaces therein so as to prevent endwise displacement of said shafts from said housings, drive rings encircling the end portions of said shafts in said housings, and means on said drive member, rims and rings providing lost motion driving connections between the drive member and said shafts permitting joint drive of said shafts and partial revolution of one of said shafts relative to the other while drive is continued to the latter.

2. An equalizer mechanism as set forth in claim 1, wherein the drive member has a ring gear thereon, the mechanism including a power operated shaft carrying a gear meshing with the aforesaid ring gear, and an enclosing housing for said ring gear and companion gear having a bearing therein for said power operated shaft and opposed bearings therein for the opposed housings on the drive member.

3. An equalizer mechanism comprising, in combination, a housing containing opposed driven shafts, opposed sleeves mounted in bearings in said housing and disposed in concentric relation to said shafts and having driving connections therewith, a stub shaft disposed between said driven shafts in concentric relation therewith and rotatably received at its opposite ends in said sleeves, a drive member supported on said stub shaft between said sleeves, said sleeves having annular rims thereon in spaced relation to the drive member, drive rings rotatably mounted on said sleeves between said rims and said drive member, and means on said drive member, rims, and rings providing lost motion driving connections between the drive member and said sleeves permitting joint drive of said driven shafts and partial revolution of either of said shafts relative to the other while drive is continued to the latter.

4. An equalizer mechanism comprising, in combination, a housing comprising an enlarged hollow central portion and reduced opposed coaxial tubular end portions which extend to the wheels to be driven, a driving pinion meshing with a driven gear in the enlarged central portion of said housing, said driven gear having a central hub portion in substantially coaxial relation with the tubular end portions of the housing adapted to transmit drive from its opposite sides to the driven wheels, and equalizing drive means comprising opposed groups of concentric drive rings having bearing support in the tubular end portions of said housing, the outermost rings of said groups having driving connections with the driven wheels, the innermost rings of said groups having driving connections with opposite sides of the central hub portion of the driven gear, and interengaging means on said rings providing lost motion driving connections therebetween.

5. An equalizer mechanism comprising, in combination, a housing comprising an enlarged hollow central portion and reduced opposed coaxial tubular end portions which extend to the wheels to be driven, a driving pinion meshing with a driven gear in the enlarged central portion of said housing, said driven gear having a central hub portion in substantially coaxial relation with the tubular end portions of the housing adapted to transmit drive from its opposite sides to the driven wheels, shaft means extending from the driven wheels through the tubular end portions of the housing and through said driven gear, and equalizing drive means comprising opposed groups of concentric drive rings having bearing support in the tubular end portions of said housing and providing bearing support therein for said shaft means, the outermost rings of said groups having driving connections with the driven wheels, the innermost rings of said groups having driving connections with opposite sides of the central hub portion of said driven gear, and interengaging means on said rings providing lost motion driving connections therebetween.

6. An equalizer mechanism comprising, in combination, a housing comprising an enlarged hollow central portion and reduced opposed coaxial tubular end portions which extend to the wheels to be driven, a driving pinion meshing with a driven gear in the enlarged central portion of said housing, said driven gear having a central hub portion in substantially coaxial relation with the tubular end portions of the housing adapted to transmit drive from its opposite sides to the driven wheels, two opposed shafts for driving the wheels extending through the tubular end portions of the housing from the central portion, bearings in the inner ends of said tubular end portions of said housing adjacent the central portion, an intermediate shaft for supporting the driven gear, and equalizing drive means comprising opposed combination coupling, bearing, and drive transmitting members having drive coupling connections with the inner ends of said first-mentioned shafts and bearing engagement in said bearings and providing bearing support therein for the opposite ends of the intermediate shaft, said members having drive transmitting flanges thereon in laterally spaced relation to the opposite sides of the central hub portion of the driven gear, opposed groups of concentric drive rings surrounding the aforesaid combination coupling, bearing, and drive transmitting members between the drive transmitting flanges on said members and the central hub portion of the driven gear, and interengaging means on said hub portion, rings, and flanges providing lost motion driving connections between the first-mentioned shafts and the driven gear.

WILLIAM RECKHOW.